United States Patent

Robertson et al.

[11] Patent Number: 5,155,957
[45] Date of Patent: Oct. 20, 1992

[54] FIRE SAFETY DEVICE

[75] Inventors: Eric B. Robertson, Brandenton; John C. Ibasfalean; Daniel D. Ibasfalean, both of Cortez, all of Fla.

[73] Assignee: National Improvement Company, Inc., Cortez, Fla.

[21] Appl. No.: 658,842

[22] Filed: Feb. 22, 1991

Related U.S. Application Data

[63] Continuation-in-part of Ser. No. 640,731, Jan. 14, 1991.

[51] Int. Cl.⁵ ............................................. F16K 17/36
[52] U.S. Cl. ............................................. 52/232; 52/1; 52/317; 52/221; 137/75; 137/360
[58] Field of Search .............. 52/232, 317, 221, 1; 137/75, 360

[56] References Cited

U.S. PATENT DOCUMENTS

| | | | |
|---|---|---|---|
| 3,726,050 | 4/1973 | Wise et al. | 52/232 |
| 4,136,707 | 1/1979 | Gaillot et al. | 52/232 |
| 4,642,956 | 2/1987 | Harbeke . | |
| 4,848,043 | 7/1989 | Harbeke . | |
| 4,850,385 | 7/1989 | Harbeke . | |
| 4,882,886 | 11/1989 | Harbeke . | |
| 4,888,925 | 12/1989 | Harbeke . | |
| 4,894,966 | 1/1990 | Bailey et al. . | |
| 4,916,800 | 4/1990 | Harbeke . | |
| 4,918,761 | 4/1990 | Harbeke . | |

OTHER PUBLICATIONS

Metaline Metacaulk Brochure 07270/MET (four pages).
Product Data Sheet Metacaulk Brochure 950 Fire Stopping Penetration Sealant (Jan. 1990).
Brochure from Fox Couplings entitled "Product Data 'SLV' PVC Fire Stop Sleeve".
Brochure from Fox Couplings entitled "Product Data 'CIP' Cast-In-Place PVC Firestop Coupling".

*Primary Examiner*—David A. Scherbel
*Assistant Examiner*—Wynn E. Wood
*Attorney, Agent, or Firm*—Browdy and Neimark

[57] ABSTRACT

A fire safety device for closing through-holes in floors and walls and for thus stopping the potential spread of fire and smoke in case of the occurrence of a fire, includes a section of conduit, a cup-shaped retainer spaced from the outside surface of the conduit section so as to define an annular space therebetween, the annular space containing a suitable and pre-measured quantity of intumescent material, and a floating floor below the intumescent material which, in the event of fire, will move inwardly to occupy the interior space previously occupied by the conduit section.

16 Claims, 3 Drawing Sheets

FIRE SAFETY DEVICE

This is a continuation-in-part of parent, co-pending application Ser. No. 07/640,731, filed Jan. 14, 1991, the contents of which are hereby incorporated by reference.

FIELD OF INVENTION

The present invention relates to a fire safety device, and more particularly a device used in construction for closing or sealing through-holes in floors and walls and for thus stopping the spread of fire and smoke.

BACKGROUND OF THE INVENTION

It is now common practice, and it has been for many years, to build commercial buildings of reinforced concrete. Even when buildings are made from structural steel, it is common for the floors between stories to be formed of cast concrete or other fire resistant materials. Even if floors and separating walls are made from materials other than concrete, fire stopping is required by model building codes to prevent a fire from passing through the floor or walls, in order to prevent the spread of fire and to prevent destructive heat and toxic combustion products from spreading dangerously throughout a building.

On the other hand, it is necessary for there to be through-openings in such floors and walls so that electrical wiring and pipes of various types can pass through such floors and walls. The provision of such openings for pipings of various types to pass through walls and floors of course creates problems insofar as the building codes are concerned, because these openings can permit passage therethrough of fire and/or smoke upon destruction of the piping which normally passes through these openings. Therefore, modern building codes require that when a fire or smoke rated floor is penetrated, it must be restored to its original integrity. Penetration can occur when the type of penetrating material, which may be metal, plastic, insulated or glass pipe, insulated cable, etc. is destroyed by a fire.

Model building codes, including the Standard Building Code, emphasize "approved methods" for fire stopping in such situations, such "approved methods" having been tested using nationally recognized standards at a recognized independent third party testing laboratory, such as Underwriters Laboratories, Factory Mutual, etc. As a result, certain manufacturers (such as the 3M Company and Metaline Company) have developed certain intumescent compositions which may be in the form of wrapping tape or which may be dispensed from a tube (such as caulking material is dispensed) for injection into and around openings passing through fire rated walls and floors and outside the pipes which also pass through such openings. Among prior patents which disclose such intumescent compositions are Dietlein et al U.S. Pat. Nos. 4,686,244 and 4,719,251; von Bonin et al U.S. Pat. No. 4,694,030; Merrill U.S. Pat. No. 3,868,346 and Pratt et al U.S. Pat. No. 4,052,526.

The theory is that under severe fire exposure which results in destruction of the piping material and consequent spread of smoke, heat and/or fire through the entire opening, the intumescent material will expand and completely fill the void and thereby restore the integrity of the floor or wall, thereby at least inhibiting the spread of fire and smoke.

In practice, however, it is difficult and time consuming to apply such intumescent material from a caulking gun; and, moreover, because the application is done manually it varies from location to location and even more so among different applicating personnel, so that in many cases the application is not adequate. Another problem in this prior art is the leakage of expanding intumescent material upon being subjected to fire or the heat generated by the fire; even where metallic collars are manually wrapped about the joint to contain the intumescent material, these collars cannot be applied sufficiently tightly to prevent leakage of the expanding intumescent material from the joint. As a result, insufficient expanded intumescent material may remain in the opening to adequately perform its intended function of restoring the integrity of the floor or wall.

Various attempts have been made to solve these problem including those set forth in the various patents to Harbeke U.S. Pat. No. 4,642,956; 4,848,043; 4,850,385; 4,882,886; 4,888,925; 4,916,800 and 4,918,761. However, these attempts have not proven commercially successful to date. Instead, the art continues to use the relatively primitive approach outlined above, although some cast-in-place fire stop couplings are available in the marketplace.

The Parent Application

The parent application Ser. No. 07/640,731 provides a successful approach to solving the aforementioned difficulties for the restoration of the integrity of fire or smoke rated floors and walls when the opening passing therethrough is less than about 3 inches in diameter. However, when the openings are of size 3 inches or greater, the system exemplified in parent application Ser. No. 07/640,731 becomes increasingly less effective because of the inability of the intumescent material to completely span the opening of the 3-inch diameter or greater pipe or conduit which has become destroyed by the fire. In other words, while the molten, foaming intumescent material will spread inwardly to substantially completely seal the opening vacated by a 3-inch or smaller pipe or conduit, such sealing becomes increasingly ineffective in restoring the integrity of the wall or floor as the pipe diameter becomes increasingly larger.

SUMMARY OF THE INVENTION

It is, accordingly, an object of the present invention to overcome deficiencies of the prior art, such as indicated above, and to also solve the problem mentioned immediately above in conjunction with the illustrated embodiments of parent application Ser. No. 07/640,731.

It is another object of the present invention to provide for increased safety in building construction and to inhibit the potential spread of fires and smoke in newly constructed buildings and in retrofitted buildings as well.

It is a further object of the present invention to provide a device for closing holes in ceilings and floors (hereinafter "floors") and walls especially, more particularly having pipes or conduits passing therethrough having diameters or widths in excess of 3 inches, and for inhibiting the spread of fire and smoke from one floor to another.

It is still another object of the present invention to provide a system for stopping the spread of fire and smoke, which system is less expensive because it eliminates manual application of intumescent material, and is safer and more effective because it provides for a measured and uniform amount of intumescent material on a consistent basis.

It is still a further object of the present invention to provide a pre-manufactured device containing a predetermined relatively precise quantity of intumescent material, which is easily installed by the builder, and which prevents leakage of intumescent material and ensures effective restoration of floor and wall integrity in the event of fire.

It is yet another object of the present invention to provide an improved fire safety device which has an auxiliary function of supporting pipes, and therefore provides the additional advantage of eliminating the need for conventional pipe hangers.

These and other objects are achieved according to the present invention by the use of a composite product including a section of pipe optionally having a weakened wall portion, a retainer of suitable shape capped by a cover disc surrounding the pipe and creating a generally confined space between the pipe section and the retainer, suitable extender means for extending the floor of the retainer inwardly upon destruction of the pipe section, and a properly measured quantity of intumescent composition retained within the confined space between the retainer about the exterior of the pipe section and above the extension means, so that when the pipe is subjected to intense heat generated by a fire causing destruction or partial destruction of the pipe section, the retainer becomes heated and intumescent material foams and expands along with collapse of the pipe section wall where necessary and forcing of the extension means inwardly so that the intumescent material completely fills the space previously occupied by the pipe and is retained in place by the extension means so as to restore the wall or floor into which the pipe section has been placed to its original fire stopping integrity.

BRIEF DESCRIPTION OF DRAWING

Other objects and the nature and advantages of the present invention will be more apparent from the following detailed description of specific embodiments taken in conjunction with the drawing wherein.

DETAILED DESCRIPTION OF EMBODIMENTS

Figure 1:
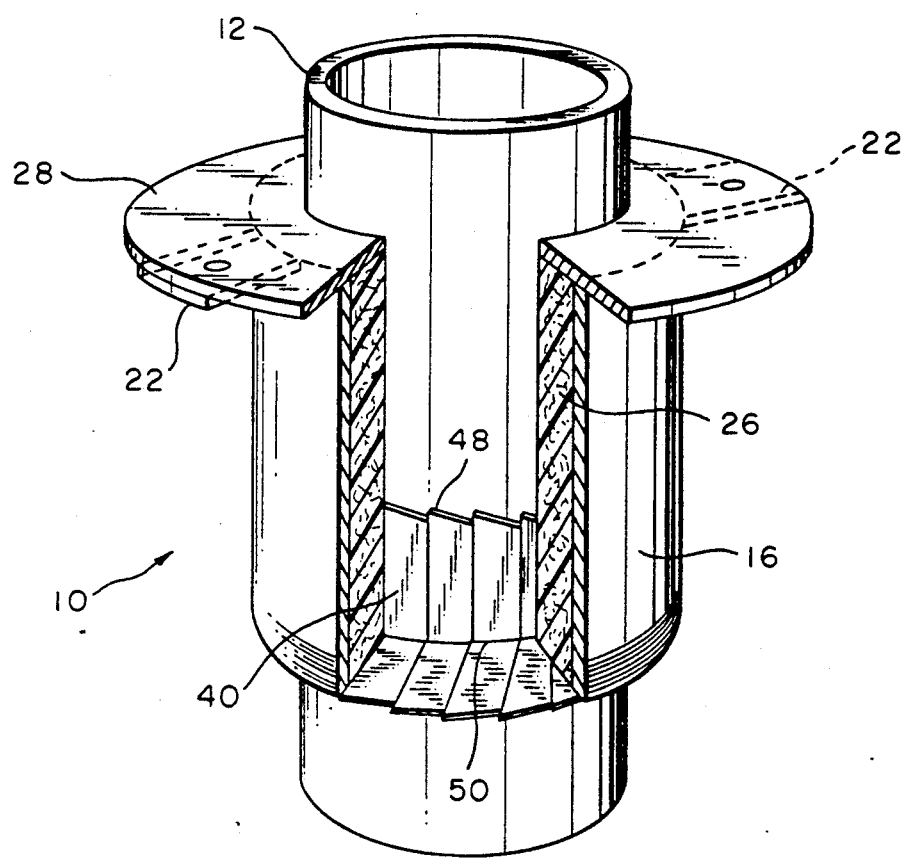
FIG. 1 is a perspective view, partially in section, taken through a device in accordance with the present invention.

With reference to FIG. 1, a device 10 according to the present invention comprises a section 12 of standard vinyl tubing or pipe or an air-conditioning and heating conduit or the like formed of relatively thin metal such as aluminum, and of any cross-section, but usually either cylindrical as illustrated or of rectangular cross-section. Surrounding the conduit or pipe 12 is a generally cup-shaped retainer 16 spaced a uniform distance from the outer surface of the pipe section 12 so as to provide a confined and generally annular space between the exterior of the pipe 12 and the interior of the cup-shaped retainer 16 in which is contained a suitable intumescent material 26 such as one of the types provided by 3M Company or Metaline Company. The confined space need not be annular in the sense of its outside configuration, e.g. the wall of the retainer 16 may have a cross-section which differs from the cross-section of the conduit 12, although such is not preferred.

Figure 6:
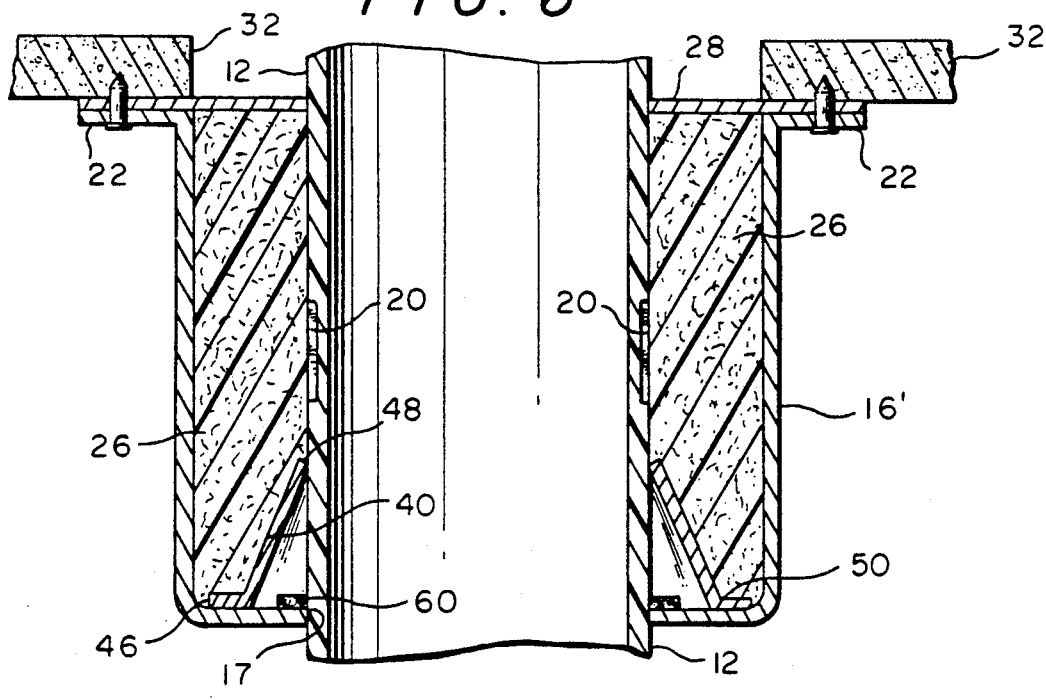
FIG. 6 is a longitudinal sectional view of another embodiment of a device in accordance with the present invention.

As indicated above, the pipe or conduit 12 may actually be formed of any suitable material and of any shape, although in the illustrated embodiment of FIG. 1 is in the form of conventional PVC piping having a diameter of 3 inches or greater. After the device 10 is placed in or more preferably adjacent a wall or floor 32 such as illustrated in FIG. 6, it will be understood that other sections of pipe or conduit of similar size and shape, provided by the builder, are attached at the top and bottom of the pipe section 12 by conventional coupling means, such as nipples, heat welding, gasketed connections, etc.

As disclosed in parent application Ser. No. 07/640,731, the wall of the pipe section 12 may be provided with a series of weakened portions as illustrated in FIG. 6, which weakened portions may merely be a plurality of indentations 20. These weakened portions 20 insure that when fire strikes causing expansion of intumescent fire retarding composition 26, such expanding intumescent material will cause collapse of the wall of the pipe section 12 in the desired locale.

The cup-shaped retainer 16, preferably formed of sheet metal and most preferably a seamless sheet metal stamping, preferably has a plurality of ears or radially outwardly extending flanges 22 at its upper end through which suitable holes may be provided for attachment such as by screws or T-nails of the cup-shaped retainer 16 to a wall surface or a floor. The retainer 16 as illustrated is spaced away from the outside walls of the pipe section 12 in all locations, except that its bottom inner annular edge 17 preferably conforms to the outside wall of the pipe section 12 in such a way as to prevent leakage of hot intumescent material therebetween.

Also provided is an annular cover disk 28, attached to the retainer 16 and also preferably made of sheet metal and provided with suitable holes for the passage therethrough of suitable anchoring elements such as screws or T-nails. The annular cover disk 28 is applied after filling the annular space with the intumescent material 28 by merely sliding same over the top of the pipe section 12. The cover disk 28, like the retainer 16, need not be annular in the sense of its outer configuration, i.e. its outer edge may be of a shape other than circular, and its inner edge will correspond to the outer configuration of the pipe or conduit 12. During fabrication of the fire safety device 10 according to the present invention, the bottom of the retainer 16 serves as a temporary spacer during filling of the retainer with the intumescent material, and then the cover plate or cover disk 28 is applied and welded, riveted or adhesively attached to the retainer 16 so that the cover disk 28 thereafter serves as a spacer during installation of the fire safety device 10 and subsequent thereto.

The device 10 according to the present invention differs from the illustrated embodiment of parent application Ser. No. 07/640,731 primarily in the provision of suitable extender means, these being in the illustrated embodiments desirably in the form of "floating" tabs 40. Functionally, the extender means serve to extend the floor of the retainer inwardly upon destruction of the pipe section 12 and thereby prevent the molten intumescent material from falling through the bottom of the space previously vacated by the pipe section 12.

Figure 4:
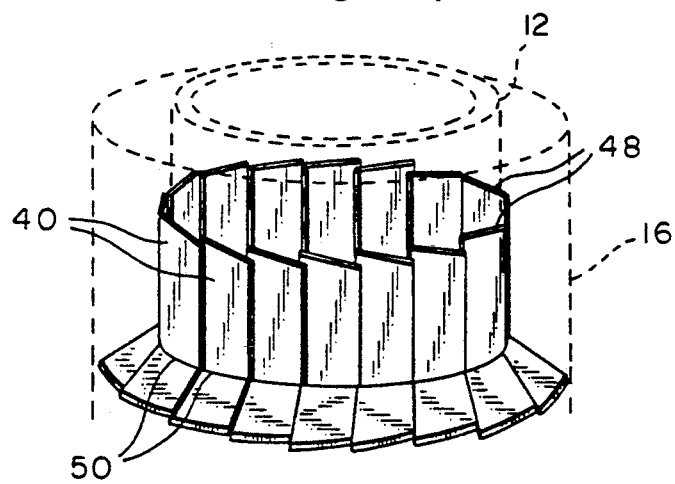
FIGS. 4 and 5 are partial, highly schematic, perspective views corresponding to FIGS. 2 and 3, respectively, illustrating the change of position of extender means in the form of floating tabs.
Figure 8:
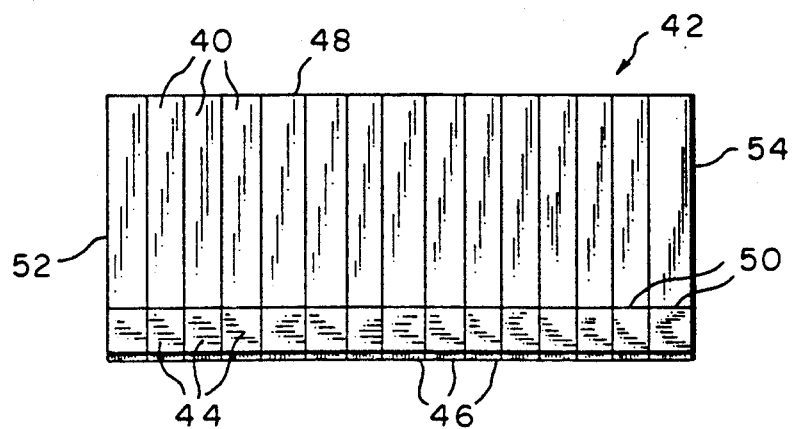
FIG. 8 is a plan view of a strip of metal cut to form floating tabs for use as an extender means according to the present invention.

Structurally, and with reference to FIG. 8 in particular, the floating tabs 40 may be formed from a strip of sheet metal 42 which is cut into a plurality of the tabs 40 suitably connected in a preferred way along in one band 44 adjacent one edge 46 of the strip 42. While it is not essential that adjacent tabs 40 be connected in order to function effectively as part of the fire safety device 10, it is preferred that they be connected for ease of assembly and the preferred means of connection is as illustrated in FIG. 8, although other modes of attachment or connection can be used, such as a strip of tape. If held together with tape or assembled separately, the tabs may be provided in overlapping fashion as shown in FIG. 1 and 4. Regardless, the cut or inner ends 48 of the tabs 40 will always be in overlapping configuration when the floating tabs are assembled within the retainer 16 of FIG. 1 or 16' of FIG. 6 because the circumference of the strip 42 in assembled position as shown in FIGS. 1, 2 and 6 is less along tab ends 48 than along strip edge 46.

In their preferred forms, the floating tabs 40 are also at an angle of preferably 100-160° along a fold line 50, preferably near the outside edge 46, so as to give each floating tab 40 a dog-leg configuration.

Figure 2:
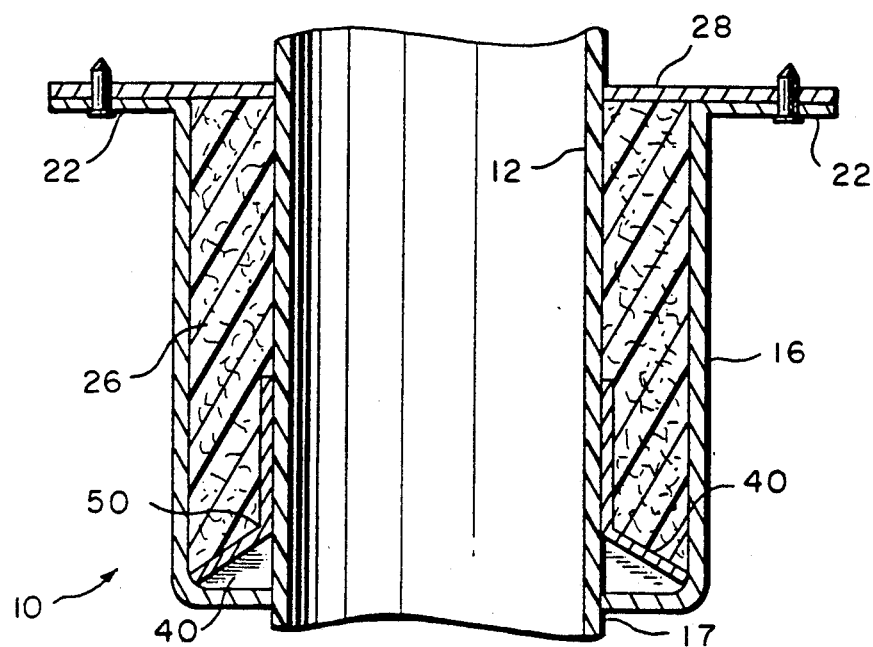
FIG. 2 is a longitudinal sectional view of the device of FIG. 1.

As can be clearly seen in FIGS. 1, 2 and 6, the floating tabs 40 are assembled at the bottom of the retainer 16, 16' above its floor so as to create in effect a false bottom for the retainer, and the intumescent composition 26 is provided in the retainer 16 or 16' above the false bottom created by the floating tabs 40. If the floating tabs 40 are provided in the form of a connected strip such as that shown in FIG. 8, it is only necessary to bring the two opposite edges 52 and 54 together so that the inner ends 48 of the tabs 40, in overlapping configuration, conform to the exterior configuration of the pipe section 12 as perhaps best shown in FIG. 4.

Figure 3:
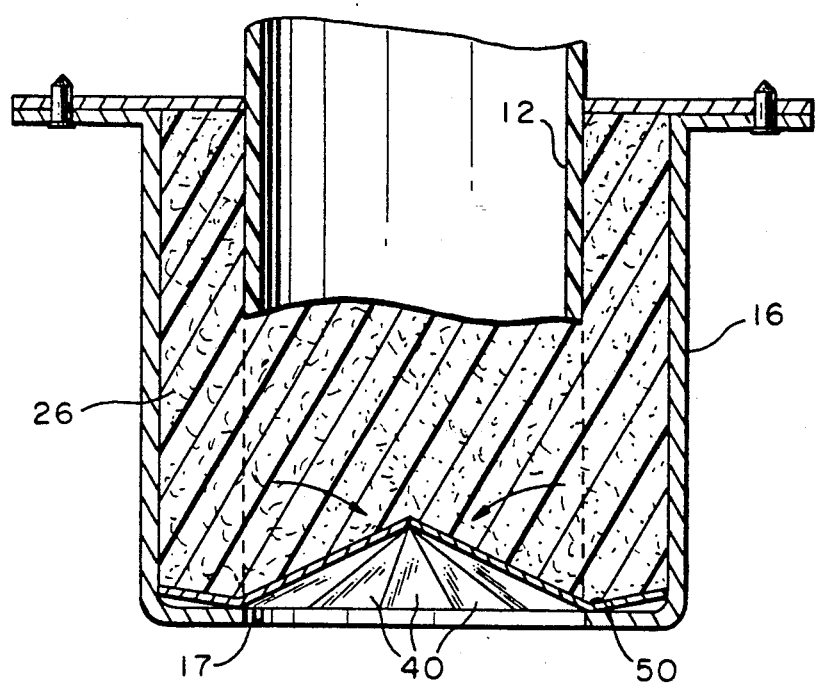
FIG. 3 is a schematic view, also in section, showing what occurs during a fire.
Figure 5:
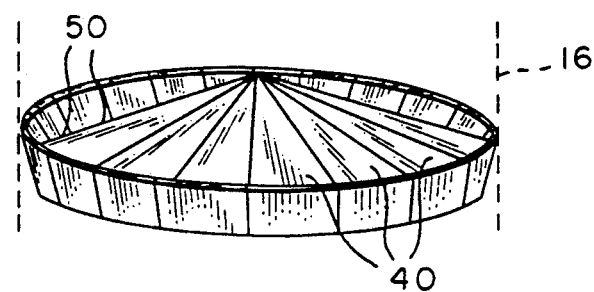
Figure 7:
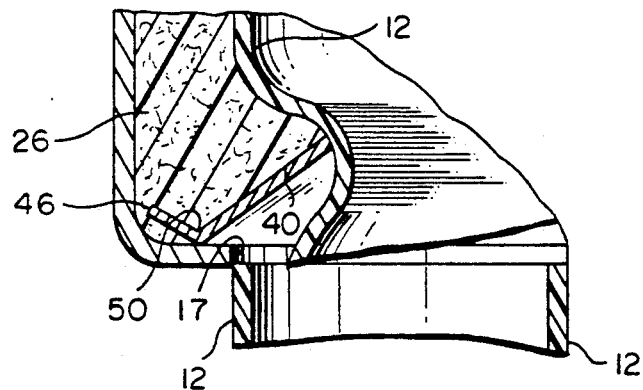
FIG. 7 is a further schematic, partial sectional view showing what occurs during a fire, similar to FIG. 3.

FIGS. 3, 5 and 7 best illustrate what occurs during the course of a fire. As heat begins to build-up, the intumescent material 26 begins to foam and generate pressure and at the same time the wall of the pipe or conduit 12 begins to fail as schematically illustrated in FIG. 7. The pressure generated by the intumescent foam above the floating tabs 40 begin to drive the tabs 40 downwardly and inwardly as illustrated in FIG. 7 culminating, in the ideal situation, with the configuration illustrated in FIGS. 3 and 5 with the tabs 40 forming a new bottom wall which has spanned or substantially spanned the void area which had been previously occupied by the center of the pipe or conduit 12.

The new bottom wall formed by the floating tabs 40 which have been driven inwardly toward the center line of the pipe 12 as shown in FIGS. 3 and 5 serves to prevent the molten intumescent material from falling downwardly through what otherwise would be an opening. It will be understood that for satisfactory functioning it is not necessary for the floating tabs to fully close the opening to the ideal as illustrated in FIGS. 3 and 5, but it is only necessary that the opening remaining be no greater than about three inches across.

FIG. 6 shows the use of an annular gasket 60 desirably formed of elastomeric material and which is used primarily to facilitate assembly and installation of the fire safety device of the present invention. The gasket 60 tightly squeezes the outside wall of the conduit section 12 and serves to prevent such section 12 from merely falling through the corresponding opening defined by the inner edge 17 of the cup-shaped retainer 16 or 16'.

In one example, the tabs 40 have an overall length of about 5 cm., the bend 50 is provided 1 cm. from the edge 46 and the connected zone 44 has a width of 2 mm. The intumescent material comprises a bottom layer of Medline 950, a middle layer of Medline 880, and an upper layer of Medline 950.

Fire safety devices according to the present invention are provided as prefabricated units to the builder, who then merely needs to place one of these in or preferably adjacent an opening in a fire barrier wall or floor 32 (FIG. 6). If desired and as preferred, the unit is anchored to the wall or floor 32 by nails, screws or the like passing through holes in the ears or flanges 22 and the cover disk 28. As indicated above, after installation of the fire safety device, the ends of the conduit section 12 are merely connected to other sections using conventional technology. Conventional pipe hangers are eliminated because the entire system is held in place by the fire safety device itself attached to the wall or floor 32 by screws or nails.

The device of the present invention remains in place within a building in its illustrated form, until such a time as a fire occurs. When the temperature reaches a certain elevation which is predetermined by the nature of the intumescent material 26, such intumescent material begins to expand and from that point on the process proceeds as described above in conjunction with FIG. 7, 3 and 5. It will be understood that the intumescent material 26 can only expand inwardly because the metal retainer 16 and the cover disk 28 prevent expansion outwardly and upwardly, the cover disk 28 further assisting in preventing the spread of fire by sealing the periphery of the opening in the floor 32. It will be understood that fire safety devices according to the present invention may be provided in various sizes in order to fit various size holes and conduits which passed therethrough. Other materials can be used in place of those described above, and different types of retainers can be used.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a fire safety device for use in construction to seal an opening in a fire or smoke rated floor or wall to restore integrity of the floor or wall upon occurrence of a fire, comprising:

a hollow conduit section having an exterior surface;

a retainer surrounding said conduit section and having a portion spaced therefrom to create a confined space between said conduit section exterior surface and said retainer, said retainer further having a portion generally defining a floor thereof;

a pre-selected quantity of intumescent material within the confined spaced between said retainer and said conduit exterior surface; and a cover disk means for preventing escape of hot intumescent material from the confined space between said retainer and said conduit section at an end of said retainer opposite said portion defining its floor;

the improvement wherein said fire safety device further comprises;

extension means for extending the floor of said retainer inwardly upon destruction of said conduit section, said extension means resting on an inner surface of said retainer but being unconnected to said retainer.

2. In a fire safety device for use in construction to seal an opening in a fire or smoke rated floor or wall to restore integrity of the floor or wall upon occurrence of a fire, comprising:

a hollow conduit section having an exterior surface;

a retainer surrounding said conduit section and having a portion spaced therefrom to create a confined spaced between said conduit section exterior surface and said retainer, said retainer further having a portion generally defining a floor thereof;

a pre-selected quantity of intumescent material within the confined spaced between said retainer and said conduit exterior surface; and a cover disk means for preventing escape of hot intumescent material from the confined space between said retainer and said conduit section at an end of said retainer opposite said portion defining its floor;

the improvement wherein said fire safety device further comprises extension means for extending the floor of said retainer inwardly upon destruction of said conduit section, said extension means comprising a plurality of floating tabs in generally side-by-side relationship extending generally across said confined space above said floor of said retainer.

3. A device according to claim 2 wherein said retainer is formed of metal.

4. A device according to claim 2 wherein said cover disk means is formed of metal.

5. A device according to claim 2 wherein said conduit section has at least one weakened portion adjacent said intumescent material at a level not substantially above the level of said extension means.

6. A device according to claim 5 wherein said weakened portion is an indentation in said exterior wall of said conduit section.

7. A device according to claim 2 wherein said retainer is cup-shaped and has a plurality of radially extending ears at said end opposite said floor.

8. A device according to claim 2 wherein said retainer is cup-shaped and comprises a seamless sheet metal stamping.

9. A device according to claim 7 wherein said cover disks means is an annular plate having an outside diameter which extends radially beyond the ends of said ears.

10. A device according to claim 2 wherein said floating tabs each have a generally dog-leg configuration.

11. A device according to claim 10 wherein said floating tabs are connected adjacent to one another.

12. A fire safety device according to claim 1, wherein said extension means comprises a plurality of floating heat conductive tabs in generally side-by-side relationship.

13. A device according to claim 12, wherein said floating tabs form a circular configuration, said floating tabs being connected adjacent to one another at a location at or near an outer circumference thereof and being overlapping at an inner circumference thereof.

14. In a fire safety device for use in construction to seal an opening in a fire or smoke rated floor or wall to restore integrity of the floor or wall upon occurrence of a fire, comprising:

a hollow conduit section having an exterior surface and defining a central axis;

a retainer surrounding said conduit section and having a portion spaced therefrom to create a confined space between said conduit section exterior surface and said retainer, said retainer further having a portion generally defining a floor thereof;

a pre-selected quantity of intumescent material within the confined space between said retainer and said conduit exterior surface; and a cover disk means for preventing escape of hot intumescent material from the confined space between said retainer and said conduit section at an end of said retainer opposite said portion defining its floor;

the improvement wherein said fire safety device further comprises extension means for extending the floor of said retainer inwardly upon destruction of said conduit section, said extension means comprising a plurality of elements collectively defining an outer circumference, said elements being capable of moving inwardly in a generally equal manner from said outer circumference toward said axis upon destruction of said conduit section.

15. A device according to claim 14, wherein said elements comprise a plurality of floating heat-conductive tabs in generally side-by-side relationship.

16. A device according to claim 15, wherein said floating tabs are connected adjacent one to another.

* * * * *